United States Patent [19]
Ellis et al.

[11] Patent Number: 5,504,858
[45] Date of Patent: Apr. 2, 1996

[54] METHOD AND APPARATUS FOR PRESERVING DATA INTEGRITY IN A MULTIPLE DISK RAID ORGANIZED STORAGE SYSTEM

[75] Inventors: Robert A. Ellis, Woodland Park; Clark E. Lubbers, Colorado Springs; Steven J. Malan, Woodland Park; Peter Rivera, Colorado Springs; Sid Snyder, Colorado Springs; David W. Thiel, Colorado Springs; Richard B. Wells, Colorado Springs, all of Colo.

[73] Assignee: Digital Equipment Corporation, Maynard, Mass.

[21] Appl. No.: 385,227

[22] Filed: Feb. 8, 1995

Related U.S. Application Data

[63] Continuation of Ser. No. 85,020, Jun. 29, 1993, abandoned.

[51] Int. Cl.$^6$ .................................................. G06F 11/00
[52] U.S. Cl. ................................ 395/182.04; 395/185.05
[58] Field of Search .......................... 395/185.05, 182.04, 395/182.03, 441

[56] References Cited

U.S. PATENT DOCUMENTS

| | | | |
|---|---|---|---|
| 4,092,732 | 5/1978 | Ouchi | 364/900 |
| 4,434,487 | 2/1984 | Rubinson et al. | 371/10 |
| 4,775,978 | 10/1988 | Hartness | 371/38 |
| 4,914,656 | 4/1990 | Dunphy et al. | 371/10.2 |
| 4,989,205 | 1/1991 | Dunphy et al. | 371/10.1 |
| 4,989,206 | 1/1991 | Dunphy et al. | 371/10.1 |
| 5,088,081 | 2/1992 | Farr | 369/54 |
| 5,166,936 | 11/1992 | Evert et al. | 371/21.6 |
| 5,233,618 | 8/1993 | Glider et al. | 371/68.1 |

OTHER PUBLICATIONS

The Digital Guide to RAID Storage Technology, 1992, Digital Equipment Corporation.

A Case for Redundant Array of Inexpensive Disks (RAID), David A. Patterson, Garth Gibson, Randy H. Katz, Report No. UCB/CSD 87/391 Dec., 1987, Computer Science Division (EECS), University of California, Berkeley, CA 94720.

A Case for Redundant Arrays of Inexpensive Disks (RAID), David A. Patterson, Garth Gibson, and Randy H. Katz, ACM SIGMOD Conference–Jun. 1–3, 1988, Chicago, Illinois.

Two Papers on RAIDs, Peter Chen, Garth Gibson, Randy H. Katz, David A. Patterson, Martin Schulze, Report No. UCB/CSD 88/479, Dec., 1988, Computer Science Division (EECS), University of California, Berkeley, CA 94720.

An Introduction to RAID–Redundant Arrays of Inexpensive Disks, Peter McLean, Apr. 24, 1991, DigitaL Equipment Corporation–CX01–2/N26.

Software and Performance Issues in the Implementation of a RAID Prototype, Edward K. Lee, Report No. UCB/CSD 90/573, May 1990, Computer Science Division (EECS), University of California, Berkeley, CA 94720.

A Queuing Analysis of RAID Architectures, Schenze Chen and Don Towsley, Coins Tech. Report 91–71, Department of Computer and Information Science, University of Massachusetts, Amherst, MA 01003.

*Primary Examiner*—Robert W. Beausoliel, Jr.
*Assistant Examiner*—Joseph E. Palys
*Attorney, Agent, or Firm*—James F. Thompson; Ronald C. Hudgens

[57] ABSTRACT

A data storage system using a RAID array and a logging process and apparatus that identifies a parity block that may not contain the proper parity for its associated data blocks and which prevents such inconsistent parity information from being used in the regeneration of unavailable data. A small fraction of the blocks of each disk are dedicated to storing parity metadata bits. The parity metadata is associated with the parity blocks and identifies whether or not each parity block contains the proper parity information for its associated data blocks or may contain invalid information. The data integrity of the RAID array is preserved by preventing the generation of undetected corrupt data.

10 Claims, 9 Drawing Sheets

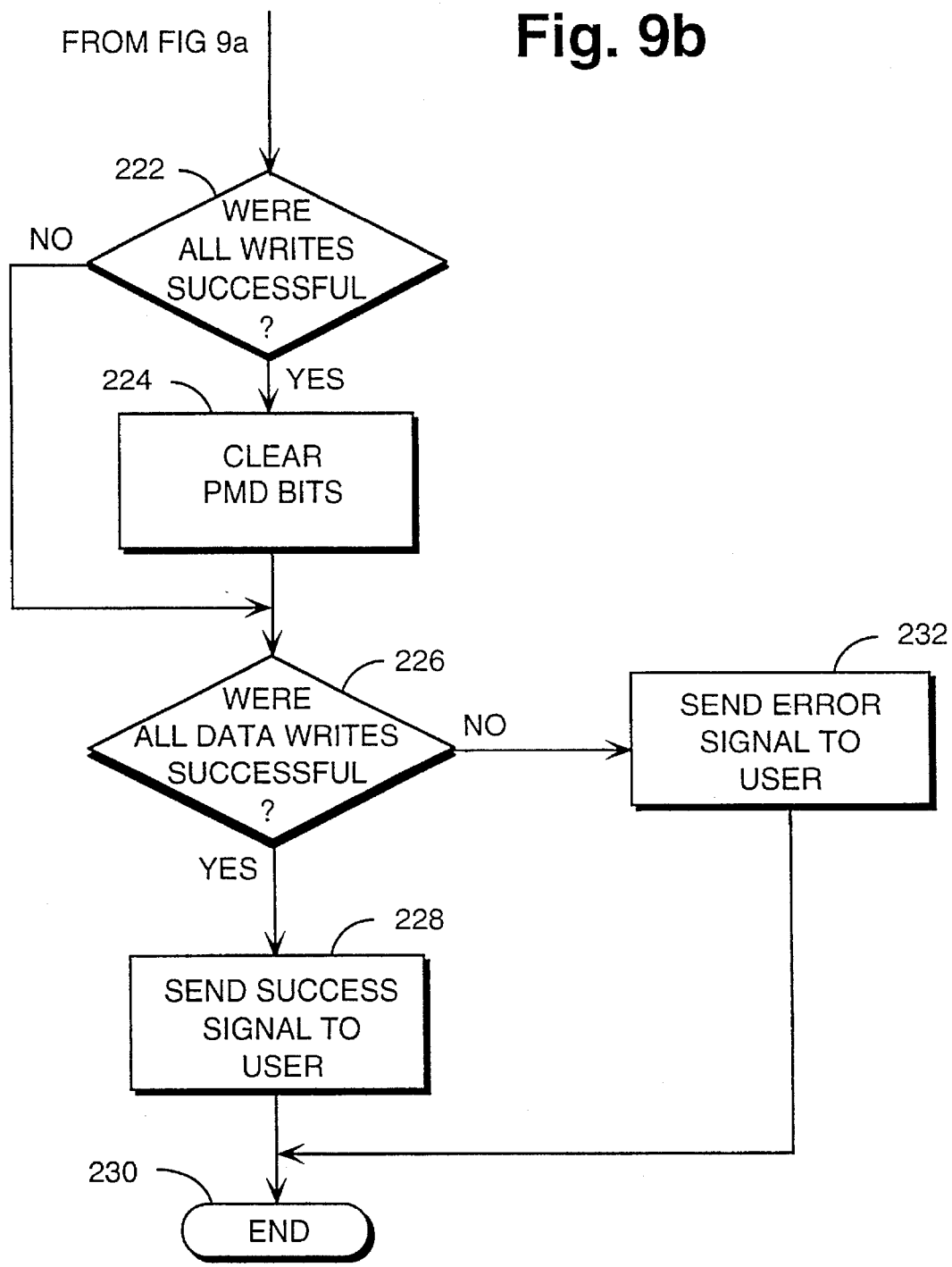

METHOD AND APPARATUS FOR PRESERVING DATA INTEGRITY IN A MULTIPLE DISK RAID ORGANIZED STORAGE SYSTEM

This is a continuation of application Ser. No. 08/085,020, filed Jun. 29, 1993, now abandoned.

FIELD OF THE INVENTION

Data storage systems using RAID-4 or RAID-5 organizations are vulnerable to undetected data corruption. If a failure occurs during a write operation which prevents the successful completion of the operation, the resulting data and parity information in the storage system may be inconsistent. If a data block on another disk that is associated with the inconsistent parity or another entire disk subsequently becomes unavailable, the use of the standard RAID algorithms to regenerate the unavailable data results in corrupt regenerated data due to the inconsistency caused by the earlier failure. Since the corrupt nature of the regenerated data is undetectable, the corrupt regenerated data is used to repair the unavailable data block and is sent to the system users. The present invention comprises a specific logging process and apparatus that identifies when an inconsistency exists between data and its corresponding parity and preserves the data integrity of the RAID array by preventing the regeneration of corrupt data using the inconsistent parity and sends an error signal to the client or user application.

BACKGROUND OF THE INVENTION

RAID (Redundant Array of Independent/Inexpensive Disks) is an organization of data on a plurality of disks to achieve varying levels of availability and performance. Performance is typically evaluated by balancing the three basic elements of I/O workloads, namely request rate, data rate and read/write ratio. The request rate is the number of I/O requests per second the system workload generates. Data rate is the amount of user data that can be transferred per second by the I/O subsystem. Of course, the read/write ratio is the ratio of read requests to write requests. One performance enhancing feature of RAID is "striping" which spreads user data across the disks in the array. Each disk in the RAID array is referred to as a member of the array. Furthermore, while disks are referred to throughout, any equivalent storage media could be used as would be apparent to one of ordinary skill in the field. The user data is broken down into segments referred to as "chunks." A chunk is a group of consecutively numbered blocks that are placed consecutively on a single disk before placing the next blocks on a different disk. A block is the smallest unit of data that can be read or written to a disk. Thus, a chunk is the unit of data interleaving for a RAID array. For example, in a four member disk RAID array the first chunk is placed on the first disk, the second chunk is placed on the second disk, the third chunk is placed on the third disk, the fourth chunk is placed on the fourth disk, the fifth chunk is placed on the first disk and so on. This spreading of data increases performance through load balancing. In a standard data storage system, if all the frequently accessed files, referred to as hot files, are on one disk, the access to the one disk creates a bottleneck. The RAID striping naturally spreads data across multiple disks and reduces the contention caused by hot files being located on a single disk.

RAID enhances availability of data through data redundancy. In RAID data redundancy is achieved by "shadowing" or "parity." Shadowing is simply having a duplicate for each disk which contains exactly the same data. Parity involves the use of error correction codes (ECC) such as Exclusive-OR or Reed-Solomon. Parity data is stored in the RAID array and is used to reconstruct the data if a disk fails or a data block otherwise becomes unavailable.

As is well known, there are several levels of RAID, each of which has different characteristics that affect performance and availability. RAID storage systems can be implemented in hardware or software. In the hardware implementation the RAID algorithms are built into a controller that connects to the computer I/O bus. In the software implementation the RAID algorithms are incorporated into software that runs on the main processor in conjunction with the operating system. In addition, the software implementation can be affected through software running on well known RAID controllers. Both the hardware and software implementations of RAID are well known to those of ordinary skill in the field.

RAID level 4 (RAID-4) and RAID level 5 (RAID-5) are organizations of data for an array of n+1 disks that provide enhanced performance through the use of striping and enhanced data availability through the use of parity. A parity block is associated with every n data blocks. The data and parity information is distributed over the n+1 disks so that if any single disk fails, all of the data can be recovered. RAID-4 is a level of organization of data for a RAID array where data blocks are organized into chunks which are interleaved among the disks and protected by parity and all of the parity is written on a single disk. RAID-5 is a level of organization of data for a RAID array where data blocks are organized into chunks which are interleaved among the disks and protected by parity and the parity is distributed over all of the disks in the array. In both RAID-4 and RAID-5 the ensemble or array of n+1 disks appears to the user as a single, more highly available virtual disk.

The contents of each bit of the parity block is the Exclusive-OR of the corresponding bit in each of the n corresponding data blocks. In the event of the failure of a single disk in the array, the data from a given data block on the failed disk is regenerated by calculating the Exclusive-OR of the contents of the corresponding parity block and the n−1 data blocks remaining on the surviving disks that contributed to that parity block. The same procedure is followed if a single block or group of blocks is unavailable or unreadable. A block or set of blocks is repaired by writing the regenerated data. The regeneration and repair of data for a data block or set of data blocks on a disk in a RAID array is referred to as reconstruction.

In a RAID array organized at RAID-4 or RAID-5, when a write operation is performed, at least two disks in the array must be updated. The disk containing the parity for the data block being updated must be changed to correspond to the new data and the disk containing the data block that is being updated must be written. These two write operations can occur in any sequence or order. Thus, at least two write operations are required to implement a single write operation to the virtual disk.

The typical disk storage system does not have any means to ensure that a pair of write operations to two separate disks either both happen or neither happens. Thus, there is a failure mode in which one, but not both, of a pair of write operations happens. Such a failure could occur in any number of ways, for example, when the controller implementing the array function fails. In the event of such a failure the write operation is not successful and there is an inconsistency between the data blocks and the corresponding parity block. If a subsequent failure occurs that renders a different one of the disks in the array unavailable, the RAID-4 or RAID-5 algorithms attempt to regenerate the data on the now unavailable disk by computing the Exclusive-OR of the data and parity on the remaining disks. But due to the prior failure occurring during the pair of write operations, the data or parity information being used to regenerate the data on the unavailable disk does not correspond and the regenerated data will not be the data that was stored on the unavailable disk. The same procedure is followed if the subsequent failure involves a single data block or group of data blocks on a different one of the disks in the array that is unreadable. In either event, the regenerated data is written at the unavailable data block and sent to the requesting application user or client. Thus, undetected data corruption has occurred.

One known method of reducing the problem of undetected corrupt data as described above is to execute a "scrubber" operation following the failure during the pair of write operations and before any other disk fails in order to render all of the parity blocks consistent with the associated data blocks. The problem with the use of a "scrubber" operation is that the data remains vulnerable to corruption until the scrubber has completed its function. Furthermore, the scrubbing function is a resource intensive task that requires reading the equivalent of the entire contents of n disks and writing the equivalent of the entire contents of one disk. Thus, it is desirable to identify an inconsistency between parity and data to prevent the use of the inconsistent parity in the subsequent regeneration of unavailable data and to send an error signal to the client or user application.

SUMMARY OF THE INVENTION

The present invention is a logging process and apparatus that identifies when a failure occurs during a pair of write operations to the RAID array of a storage system that leaves the data and parity information inconsistent and prevents the use of the parity resulting from the failure from being used to regenerate data for another disk or data block on another disk that is subsequently unavailable and sends an error signal or message to an application requesting a read operation to the unavailable data block. The invention completely eliminates the possibility that parity information written as a result of a failure in a pair of writing operations to the RAID array of a storage system will be used to regenerate data for another subsequently failed disk or unavailable data block. Thus, the possibility of undetected corrupt data is eliminated.

In the present invention a storage system RAID array is organized at RAID-4 or RAID-5 and a small fraction of the blocks of each disk are dedicated to storing bits that describe the state of each parity block on the same disk. These bits are referred to as parity metadata (PMD). In the preferred embodiment one bit of parity metadata is used to describe the state of each parity block. In an alternative embodiment, one bit of parity metadata is used to describe the state of a plurality of parity blocks. In another embodiment, the parity metadata comprises a list of the block numbers of each parity block which may contain invalid information. In yet another alternative embodiment, the parity metadata comprises the block number of a parity block which may contain invalid information as a starting point and a range of additional parity blocks that may contain invalid information. In other alternative embodiments, the parity metadata can be encoded or mapped in different ways to represent the parity blocks which may contain invalid information. A metadata unit (MDU) is a collection of strips and the parity metadata that describes the state of all of the parity blocks in the strips. A strip is the collection of a parity chunk and all data chunks that contribute to it. A sequence of metadata units constitutes the RAID array. The collection of parity metadata that describes the state of all of the parity blocks in a single metadata unit is referred to as a PMD segment. The parity metadata is stored on the same disk as the parity blocks that it describes and "near" to the parity blocks that it describes. The term "near" is intended to refer to sequential access since the parity block and the parity metadata are accessed in close proximity in time. In the preferred embodiment, the metadata unit comprises a number of strips which together with the PMD segment occupy a cylinder on each of the disks in the array. A cylinder is a region of a disk any part of which can be accessed without a seek operation. In one embodiment, the metadata unit comprises six strips with the PMD segment between the third and fourth strip. Of course, any number of strips can be used and the PMD segment can be placed anywhere as a matter of design choice.

In the preferred embodiment, the interpretation of each parity metadata bit is that when it is in a set state, it is possible that the corresponding parity block may not contain the Exclusive-OR parity of the corresponding data blocks and therefore cannot be relied upon to regenerate data after the failure of another disk or data block on another disk. Conversely, if the parity metadata bit is in a clear state, then the corresponding parity block definitely contains the Exclusive-OR parity of the corresponding data blocks and therefore can be reliably used to regenerate data after the failure of another disk or data block on another disk.

Whenever one or more data blocks and the corresponding parity blocks are to be updated the following sequence is performed:

1. set the parity metadata bit corresponding to each parity block to be updated;
2. complete the write operation to both data and parity blocks; and
3. clear the parity metadata bit corresponding to each parity block updated.

Thus, the parity metadata bit associated with a parity block is in the set state whenever the possibility exists that the parity block is not truly the Exclusive-OR of all the corresponding data blocks. Otherwise the parity metadata bit is in the clear state.

Whenever the contents of a parity block is to be used to regenerate an unavailable data block, the corresponding parity metadata bit is checked. If the parity metadata bit is in the set state, this indicates that the corresponding parity block may not be consistent with the data blocks that it describes and therefore cannot be used to regenerate data. If the parity metadata bit is in the clear state, then the corresponding parity block is consistent with the data blocks that it describes and can be used to regenerate data.

BRIEF DESCRIPTION OF THE DRAWINGS

Other advantages of the invention will become apparent upon reading the following detailed description and upon reference to the accompanying drawings, in which:

FIGS. 9a and 9b are flow charts according to the present invention for a read modify write operation.

Figure 1:
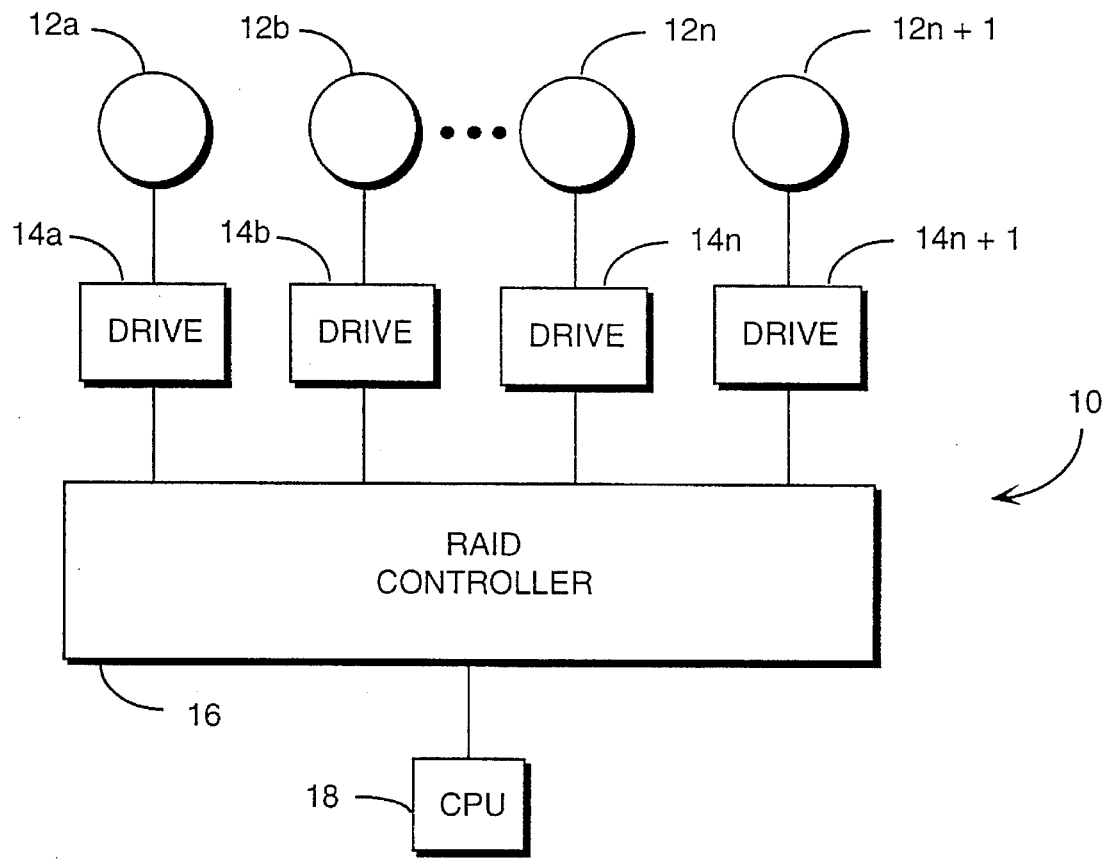
FIG. 1 is a typical storage system using a RAID array organization for implementing the present invention.

While the invention is susceptible to various modifications and alternative forms, for example, the invention can be adapted for other RAID configurations such as RAID 3, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE DRAWINGS

FIG. 1 is an illustration of a storage system 10 in which an array of n+1 disks 12 and associated drives 14 are connected to a RAID controller 16. A user or client application, such as CPU 18, gains access to the n+1 disks 12 via normal read and write commands. The n+1 disks 12 are arranged into either a RAID-4 or RAID-5 organization based upon the selection of the well known RAID algorithms implemented in the RAID controller 16. The present invention is also usable with a host based software implementation of a RAID controller.

RAID-4 and RAID-5 are closely related organizations of the n+1 disks 12 that provide enhanced performance through the use of striping and enhanced availability through the association of a parity block with every n data blocks. The data and parity information is distributed over the array of n+1 disks 12 so that if any single disk fails or otherwise becomes unavailable all of the data and/or parity information on the unavailable disk can be recovered. The same is true if a single block or group of blocks is unavailable. Throughout the detailed description any reference to a failed or unavailable disk is equally applicable to unreadable blocks or groups of blocks even though the entire disk is not unavailable. In the RAID-4 organization, all parity is on a single disk and in the RAID-5 organization, the parity information is distributed over all of the disks in the array.

All access to the array of n+1 disks 12 is through the RAID controller 16 which is connected to a user such as CPU 18. A single CPU is shown but using a plurality of CPU's is well within the ability of someone of ordinary skill in the field. The RAID controller 16 contains the standard RAID algorithms which are well known to one of ordinary skill in the art.

The array of n+1 disks 12 appears as a single, more highly available virtual disk to a user. The contents of each bit of the parity block is the Exclusive-OR of the corresponding bit in each of the n corresponding data blocks. As is well known, other error correction codes can be used to establish the mathematical relationship between the data and parity information. In the event of the failure or unavailability of a single disk in the array of n+1 disks 12, the data from a given data block on the unavailable disk is regenerated by computing the Exclusive-OR of the contents of the corresponding parity block and the n−1 data blocks on the remaining disks in the array that contributed to that parity block. The unavailable data block, if possible, is repaired by writing the regenerated data. In this manner an entire unavailable disk can be reconstructed by regenerating data and repairing data and parity blocks. Of course, the unavailable disk can be removed and a replacement disk substituted and the regenerated data is then written on the replacement disk to bring the RAID array back to fully redundant operation.

When a write operation is initiated by the CPU 18 and performed on the RAID-4 or RAID-5 array, at least two disks in the array 12 are updated. The disk containing the parity for the data block being updated is changed and the new data is written to the data block replacing the old data. These two write operations can be performed in any sequence or order. In this fashion at least two write operations are required to implement a single write operation to the "virtual" disk. A typical disk system does not have any means to ensure that for a pair of write operations to two separate disks, either both are completed or neither is completed. A failure mode occurs if one, but not both, of the pair of write operations is completed. Such a failure could occur if the RAID controller 16 which implements the RAID function fails.

If a subsequent failure occurs that renders a data block in another one of the disks in the array 12 unavailable, the RAID controller 16 will, following the appropriate RAID algorithms, regenerate the data for each data block on the now unavailable disk by computing the Exclusive-OR of the data and parity on the remaining disks. However, due to the prior failure of one of the pair of write operations the computed data will not be the data that was stored on the unavailable data block. Thus, the regenerated data returned to user or written to the unavailable data block or to the replacement disk in the array 12 is corrupted but the corruption is undetected.

Figure 2:
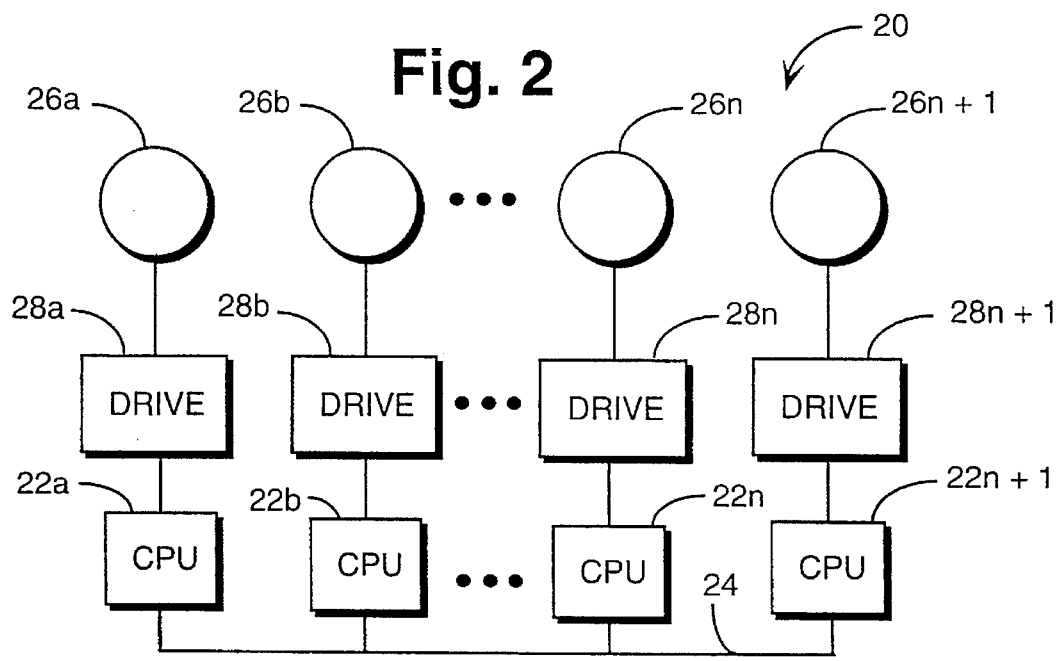
FIG. 2 is a typical storage system using a distributed host based RAID array organization for implementing the present invention.

FIG. 2 is a storage system 20 that uses a plurality of n+1 hosts or CPU's 22 interconnected over a bus 24. In this distributed implementation the RAID controller function is shared by n+1 hosts 22. In this configuration a single failure of a host during a write operation results in undetected corrupt data. In FIG. 2 each disk of the n+1 disk array 26 is connected through an associated drive 28 to a single host 22. However, a different number of hosts and disks could be used as would be apparent to one of ordinary skill in the art. Each host 22 can access the directly connected disk as well as any of the other disks through its corresponding host. For the same reasons discussed with respect to FIG. 1, each write operation to the virtual disk requires at least two write operations to the n+1 disk array 26. For example, if host 22a is writing an update to the disks directly connected to host 22b and 22n and host 22a falls before completing one but not both write operations that single failure of host 22a results in an inconsistency with the data and parity on the disks directly connected to hosts 22b and 22n in a RAID-5 organization and also makes the disk directly connected to host 22a unavailable. In such a failure mode the regeneration of the data stored on the disk directly connected to host 22a using the well known RAID algorithms will not compute the data originally stored on disk 26a due to the inconsistent data and parity on the disks directly connected to hosts 22b and 22n. Thus, due to a single failure the regenerated data will be corrupt and the corruption is undetected.

The present invention illustrated in FIG. 3 for a RAID-4 organization and in FIG. 4 for a RAID-5 organization completely eliminates the possibility of a failure in the pair of write operations leaving the data and parity information inconsistent to subsequently result in the regeneration of undetected corrupt data. The present invention is a specific logging process in which a small fraction of the blocks of each disk is dedicated to storing parity metadata. In the preferred embodiment, one bit of parity metaadata is dedicated for each parity block. In an alternative embodiment, one bit of parity metadata corresponds to a plurality of parity blocks. In another embodiment, the parity metadata comprises a list of the block numbers of each parity block that may contain invalid information. In yet another embodiment, the parity metadata comprises the block number of a parity block which may contain invalid information as a starting point and a range of additional parity blocks that may contain invalid information. In other alternative embodiments, the parity metadata can be encoded or mapped in different ways to represent the parity blocks which may contain invalid information.

Figure 3:
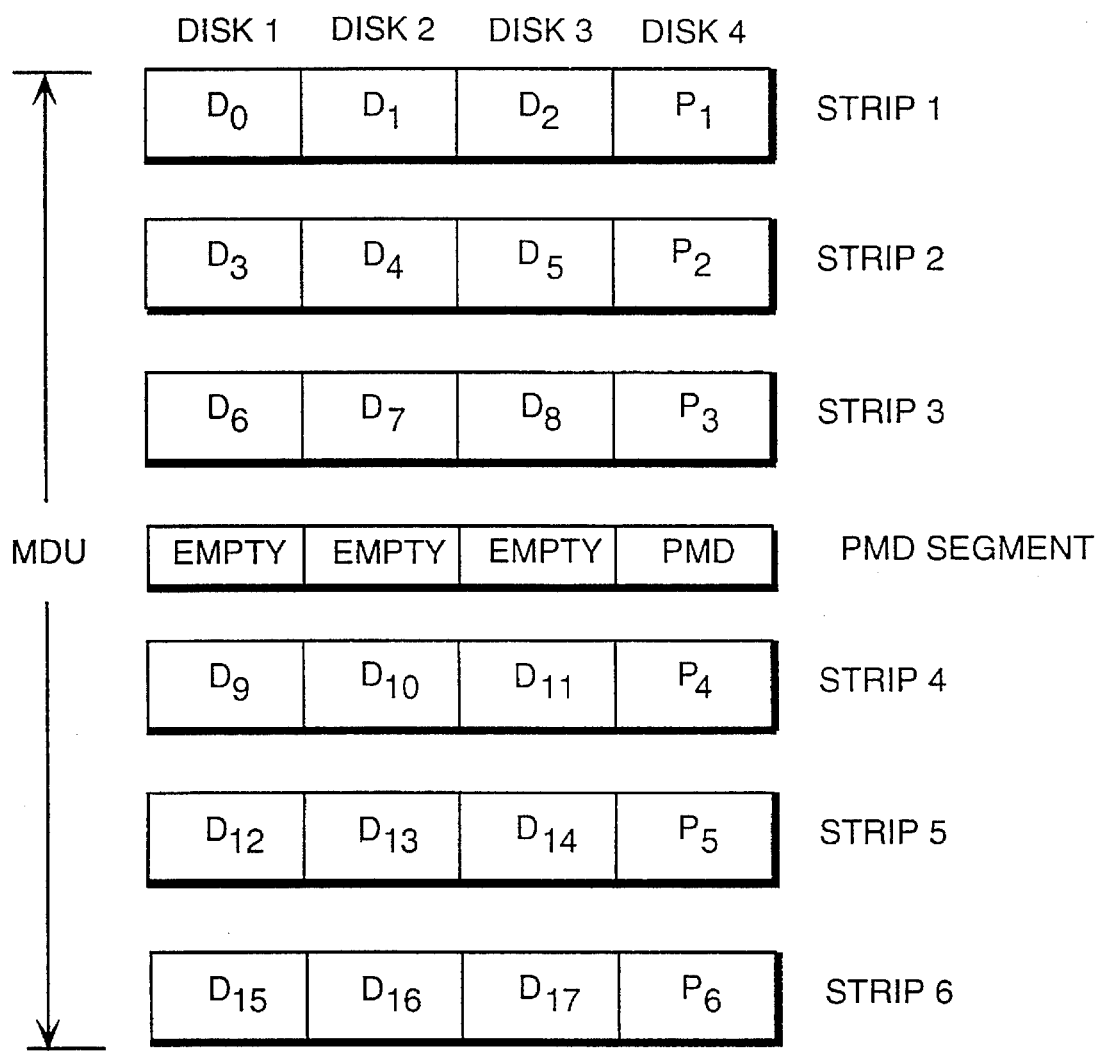
FIG. 3 is a metadata unit with a RAID-4 organization using the parity metadata of the present invention.

FIG. 3 illustrates a RAID-4 organization including a four disk array Disk 1 through Disk 4 with all of the parity information being recorded on Disk 4. Of course, any number of disks could be used in the array. In this embodiment six strips are combined into a metadata unit (MDU) with the parity metadata bits forming a PMD segment being recorded on Disk 4 in the middle of the strips. Each chunk of each strip is C blocks high and each strip contains 4C blocks of data or parity information. As is well known, the data blocks in chunk $D_0$ are recorded on Disk 1, the data blocks in chunk $D_1$ are recorded on Disk 2, the data blocks in chunk $D_2$ are recorded on Disk 3, the parity blocks in chunk $P_1$ for the data blocks in chunks $D_0$, $D_1$ and $D_2$ is recorded on Disk 4, the data blocks in chunk $D_3$ are recorded on Disk 1 and so on. The parity metadata bits are recorded on Disk 4. Thus the parity metadata bits (PMD) are located on the same disk as corresponding parity blocks. Since there are C parity blocks per strip and six strips, there are 6C parity metadata bits or one parity metadata bit for each parity block. Of course, in alternative embodiments the parity metadata bit can be encoded or mapped in different ways to represent the parity blocks which may contain invalid information.

In one embodiment, the parity metadata is one block high and located between the top three strips and the bottom three strips. The number of strips is a design consideration. In the preferred embodiment, the parity metadata bits are stored on the same disk as the associated parity blocks described and "near" the parity blocks of all the strips in the MDU. Having the parity metadata bit stored on the same disk as the associated parity block does not compromise data availability, since neither the parity block nor the parity metadata bit is useful without the other. Having the parity metadata bit stored "near" the associated parity block enhances performance, since the parity block and the parity metadata bit are accessed in close proximity in time and typical disk drives execute such operations relatively slowly. The term "near" is intended to be a relative indication of the seek time from the parity metadata bits to the parity blocks in the most remote strip in the MDU. Thus, the location of the PMD segment is a matter of design choice.

Figure 4:
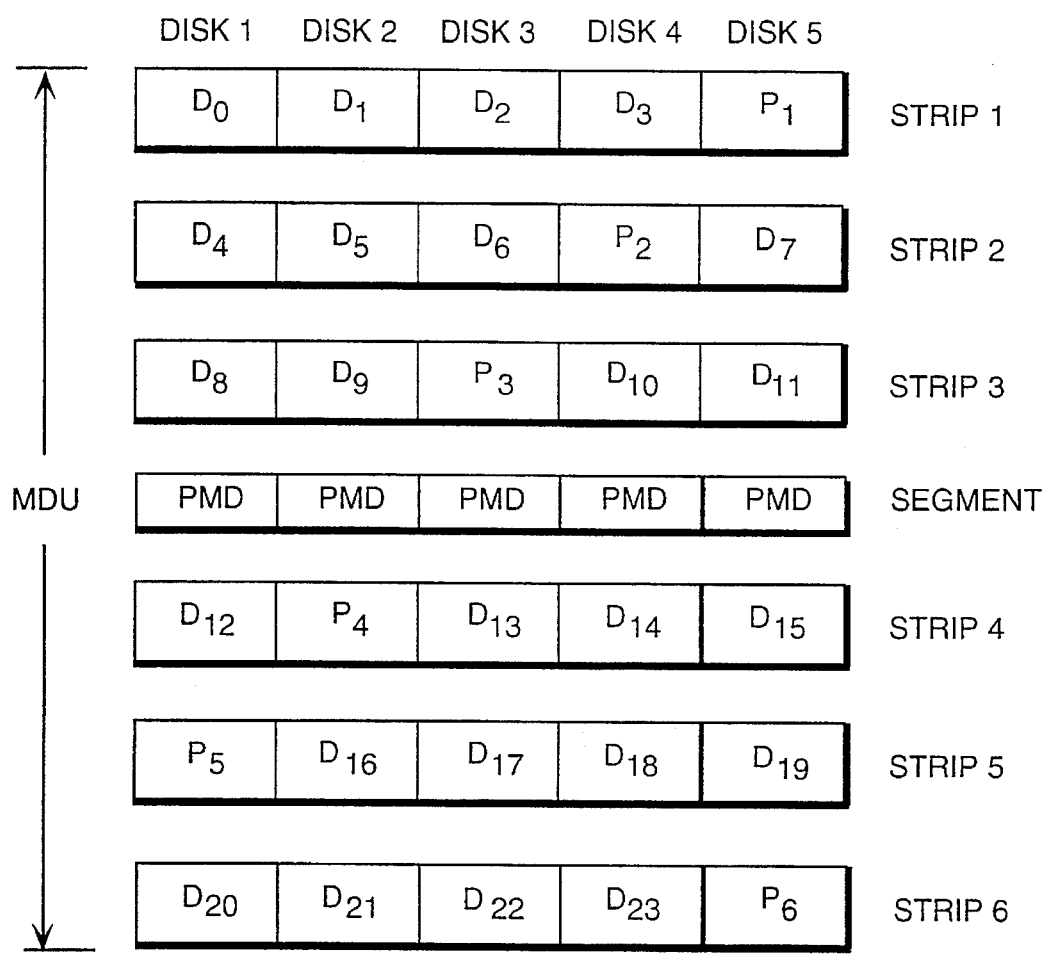
FIG. 4 is a metadata unit with a RAID-5 organization using the parity metadata of the present invention.

FIG. 4 illustrates a RAID-5 organization including a five disk array Disk 1 through Disk 5. The data is distributed over each disk in the array in the same manner as described above with respect to the RAID-4 organization in FIG. 3. In the RAID-5 organization the parity is also distributed over each disk in the array as is well known to one of ordinary skill in the field. In addition, there are various patterns of data and parity in successive strips that are well known and these differences are irrelevant to the present invention. The PMD segment containing the parity metadata is also distributed over each disk in the array. The parity metadata on Disk 1 corresponds to the parity chunk $P_5$ also on Disk 1. This sequence continues until Disk 5 which has parity metadata corresponding to the parity chunk $P_1$ and the parity chunk $P_6$. In this embodiment, the parity metadata is located between the top three strips and the bottom three strips.

Thus, in the preferred embodiment for either a RAID-4 or RAID-5 array, for each group of K successive strips, a number of blocks is allocated on each member of the array, sufficient in size to contain the parity metadata bits for each of the parity blocks on the member within the group of strips. These blocks containing the parity metadata bits are placed "near" the center of the group of K strips in order to minimize the logical distance between the parity metadata bits and the parity blocks associated therewith. The benefit of this arrangement is that for typical disks, increasing logical distance between successive accesses corresponds to increasing time for the successive accesses. However, the present invention is intended to encompass any relative placement of the blocks containing the parity metadata bits in relation to the parity blocks associated therewith and also includes the storing of the parity metadata bits in a cache for easy access as fully described hereinafter.

In the typical RAID-4 or RAID-5 configuration the highest order of organization is the strip. In the present invention the RAID-4 or RAID-5 configuration has a higher order of organization introduced, the metadata unit. A sequence of metadata units constitutes the RAID army.

Figure 5:
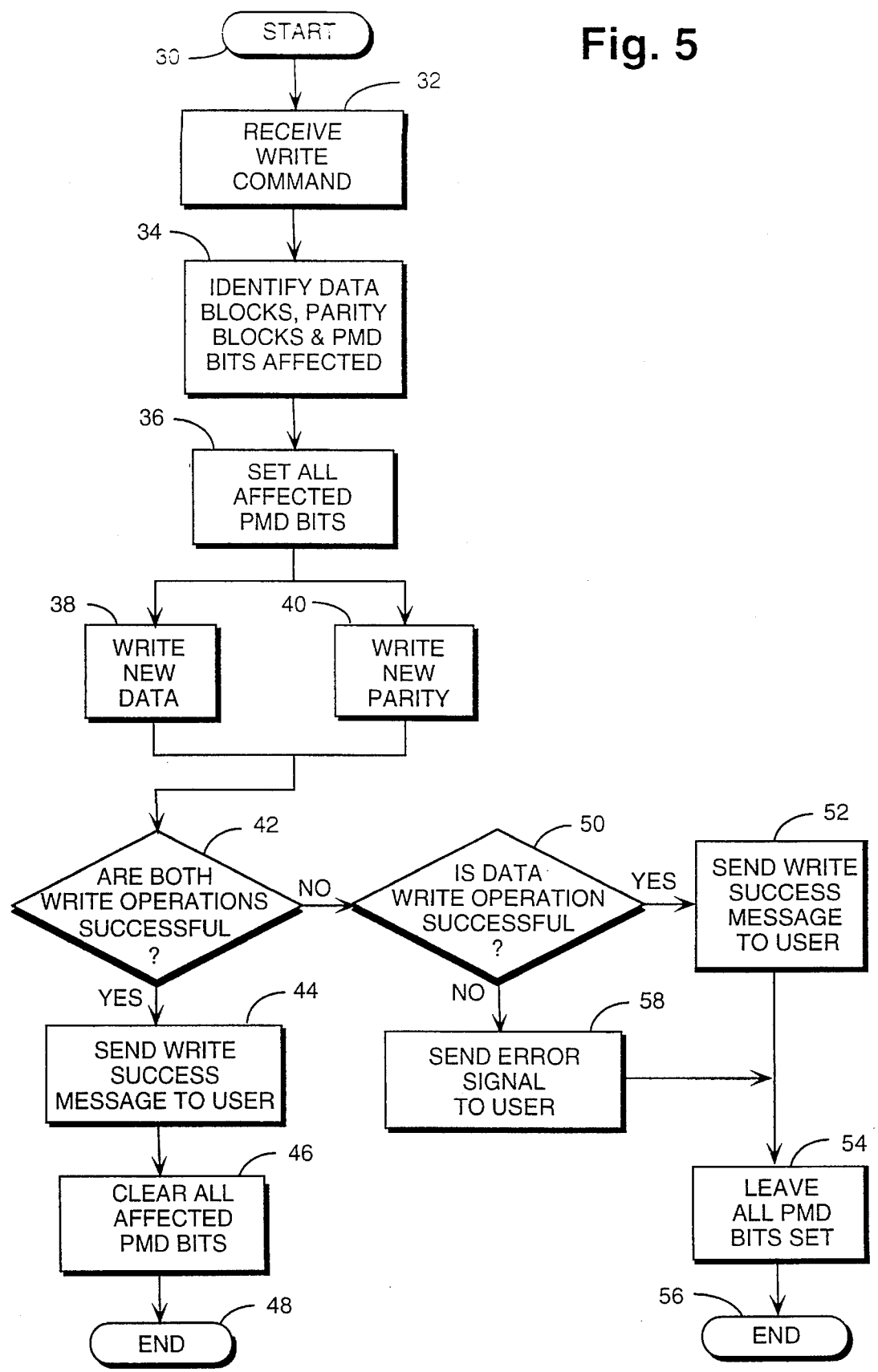
FIG. 5 is a flow chart showing a write operation using the logging process of the present invention.
Figure 6:
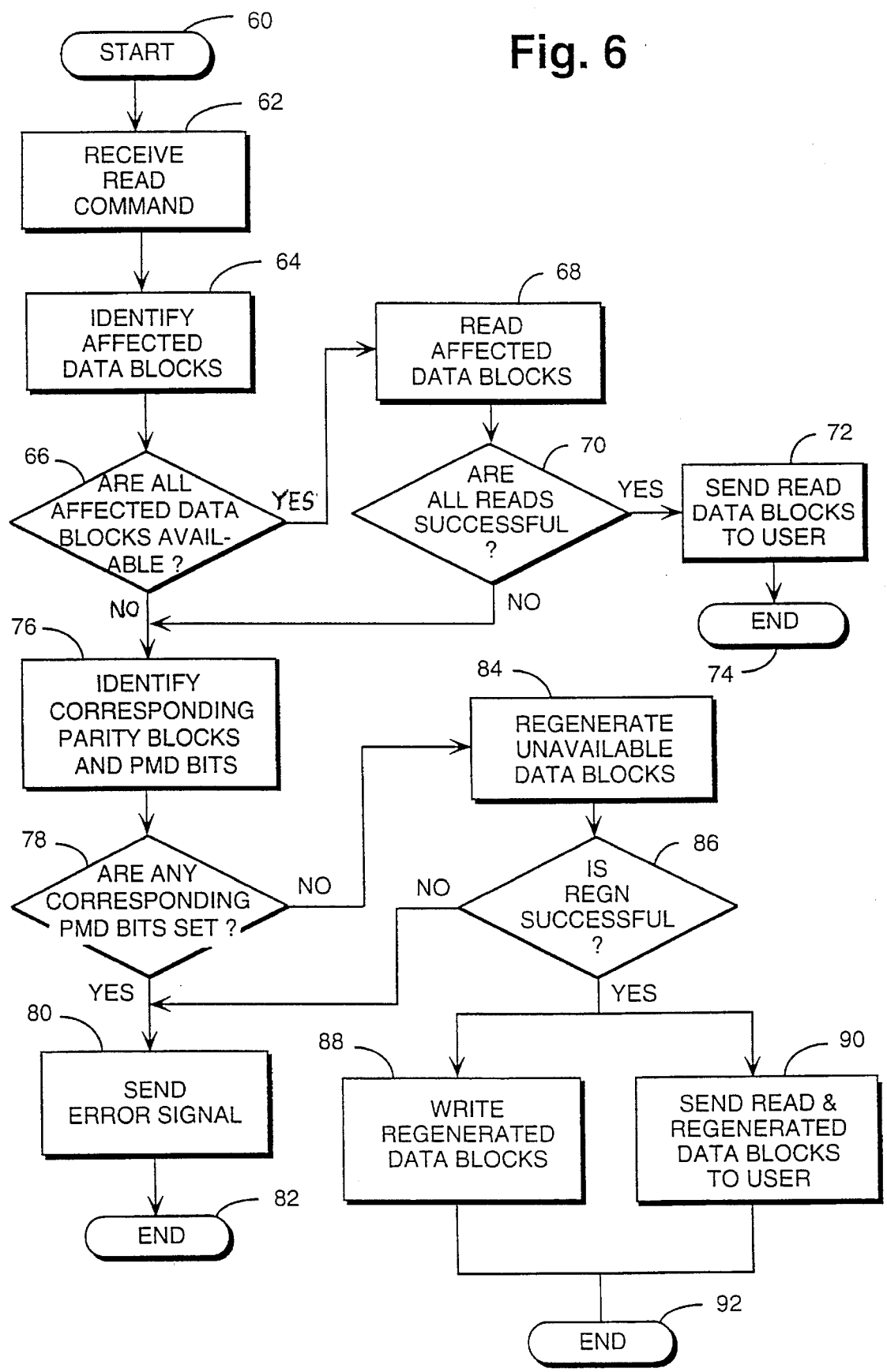
FIG. 6 is a flow chart showing a read operation using the logging process of the present invention.

The logging process of the present invention is described in FIGS. 5 and 6. In FIG. 5 a write operation is initiated at the user or client application such as the CPU 18 of FIG. 1 and represented by start block 30. The write command is received at block 32 and the affected or targeted data blocks, parity blocks and parity metadata bits are identified at step 34. Next all the affected parity metadata bits are set to a first state at step 36. Now the new data is written at the appropriate data block at step 38 and the new parity is written at the appropriate corresponding parity block at step 40. As previously explained, two write operations are required to effect a single write operation to the virtual disk. If a failure occurs during this dual write such that both write operations are not successfully completed, the data and parity may be inconsistent. Therefore, if another data block sharing that parity or another disk subsequently fails or becomes unavailable, the unavailable data is not faithfully regenerated due to the prior data/parity inconsistency and the data regenerated is corrupt but the corruption is undetected.

In the present invention, the completion of both of the write operations is determined at step 42. If the write operations were successfully completed a write success message or signal is sent to the user application at step 44 and all of the affected parity metadata bits are cleared at step 46 and the write operation ends successfully at step 48. If either write operation was not successfully completed then whether the data write operation was successful is determined at step 50. If the data write operation was successful, then a write success message or signal is sent to the user application at step 52 and all the affected parity metadata bits remain in the set state at step 54 and the write operation successfully ends at step 56. If the data write operation was not successfully completed, then an error signal or message is sent to user application at step 58, then all of the affected parity metadata bits remain in the set state at step 54 and the write operation ends unsuccessfully at step 56.

The parity metadata is used during a read and regeneration operation described in FIG. 6. The read/regeneration operation in FIG. 6 begins with a read command from the user or client application such as the CPU 18 of FIG. 1 and is represented at start step 60. The read command is received at step 62 and the affected data blocks are identified at step 64. Next the availability of the affected data blocks are checked at step 66. If all of the affected data blocks are available, then the affected data blocks are read at step 68. If all of the affected data blocks are successfully read as determined at step 70, then the read data blocks are sent to the user at step 72 and the read operation ends successfully at step 74. If at least one affected data block is unavailable, or if all of the affected data blocks are not successfully read, then the corresponding parity blocks and the parity metadata bits are identified at step 76. Next the state of the corresponding parity metadata bits is determined at step 78. If any of the parity metadata bits are set which indicates that there was a prior write operation failure affecting the consistency between the data and the parity or more than one data block contributing to the same parity is unavailable then an error signal is sent to the user at step 80 and the read operation ends unsuccessfully at step 82. If the parity metadata bits are clear at step 78, then the standard RAID algorithm regenerates the unavailable data at step 84. This is done by reading all data blocks except for the one unavailable block and the corresponding parity block and regenerating the inaccessible data as the exclusive OR of these. If the regeneration is not successful as determined at step 86, then an error signal is sent to the user and the read operation ends unsuccessfully. If the regeneration is successful as determined at step 86, then the regenerated data is written at step 88 to repair the unavailable data block and the requested data including the regenerated data is sent to the user at step 90 and the read operation ends successfully at step 92.

The flow charts of FIGS. 5 and 6, as well as latter described flow charts, as would be understood by someone of ordinary skill in the field, are equally applicable to alternative embodiments in which the parity metadata is encoded or mapped in different ways to represent the parity blocks which may contain invalid information. For example, in the alternative embodiment in which the parity metadata comprises a list of the block number of each parity block which may contain invalid information, then the operation of adding the block number for a parity block to the list corresponds to the above-described operation of setting the parity metadata bit to indicate that the corresponding parity block may contain invalid information. Similarly, the operation of removing the block number for a parity block from the list corresponds to the above-described operation of clearing the parity metadata bit. Of course, checking the status of the parity metadata bit in the preferred embodiment corresponds to checking the list in the alternative embodiment. Accordingly, the wording of the individual steps in the flow charts would change to correspond to the encoding of the parity metadata but the fundamental operation remains the same.

Figure 7:
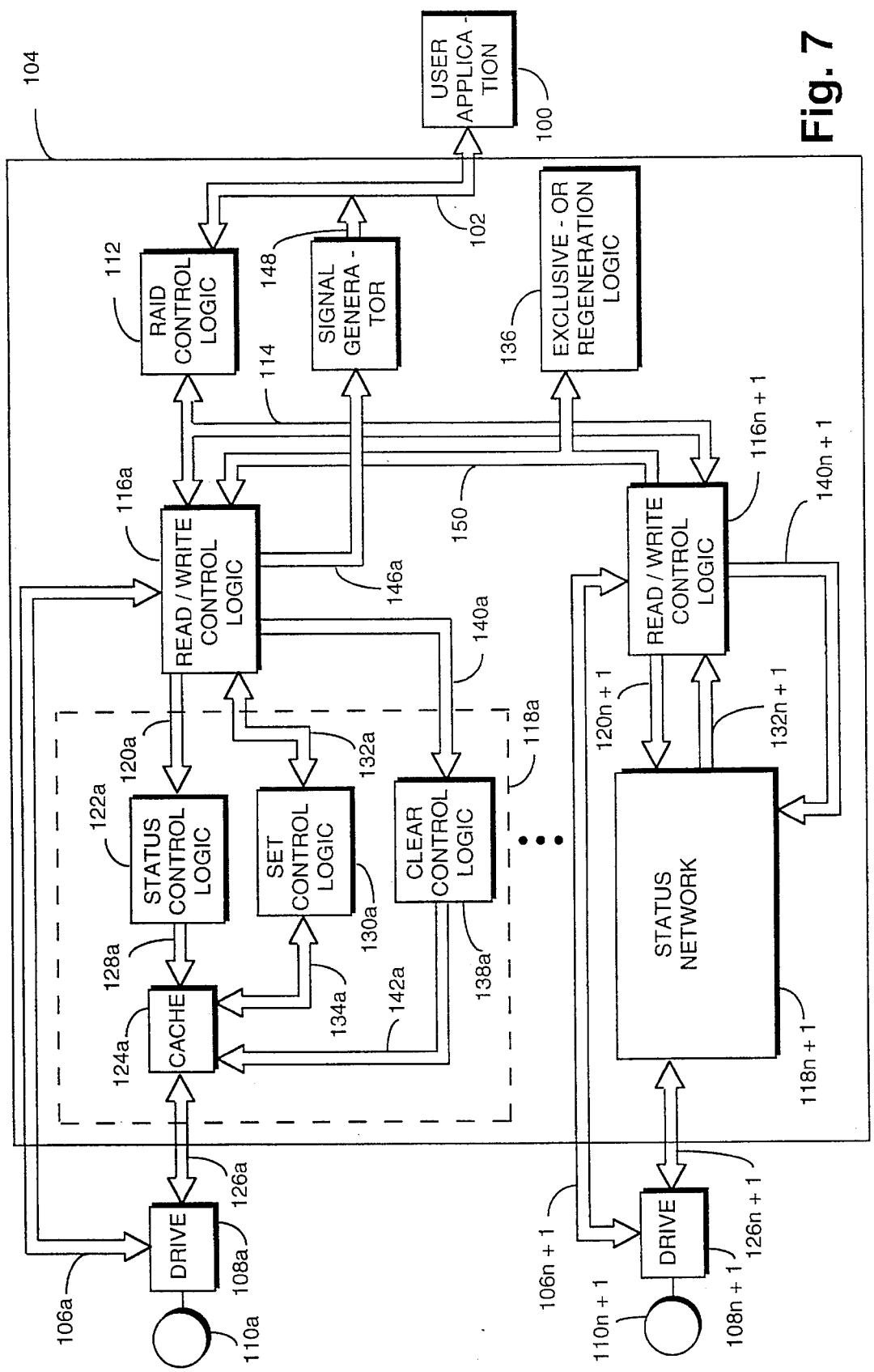
FIG. 7 is a hardware implementation of the logging process of the present invention.

FIG. 7 is a block diagram of a data storage system with a hardware RAID controller implementing the present invention. A user or client application 100 sends normal write or read commands over request/data bus 102 to the RAID controller 104. The RAID controller 104 sends control signals and data over control/data buses 106a through 106n+1 to a plurality of disk drives 108a through 108n+1 to position the read/write heads over the proper portion of the plurality of disks 110a through 110n+1. The RAID controller 104 determines which disks 110a through 110n+1 contain data and which disk 110a through 110n+1 contains parity and PMD bits. Furthermore, as is well understood by one of ordinary skill in the field, in a read operation the data read from the disks 110a through 110n+1 is passed over control/data buses 106a through 106n+1 through the RAID controller 104 and over request/data bus 102 to the user application 100.

A write request from user application 100 is received over request/data bus 102 by the RAID controller 104. Standard RAID control logic 112 receives the write request or command and determines the data blocks, parity blocks and PMD bits affected by the write operation. The RAID control logic to perform this function is well within the ability of those of ordinary skill in the field. This information is sent over control/data bus 114 to the read/write control logic 116a through 116n+1. Each control logic 116a through 116n+1 comprises a plurality of logic gates arranged to provide the described outputs based upon the various inputs and the specific arrangement of logic gates is within the skills of one ordinarily skilled in the field and a matter of design choice and is therefore not described further herein.

Each read/write control logic 116a through 116n+1 is connected to a status network 118a through 118n+1. Each status network is identical and therefore only the status network 118a connected to read/write control logic 116a is described in detail. A control signal identifying the PMD bits affected by the write operation is sent over bus 120a to the status logic control 122a which maps the identified affected PMD bits to the appropriate address in cache 124a. In this embodiment, the PMD bits are both stored on disk as described above and stored in a cache for easy access. Cache 124a is connected over bus 126a to drive 108a to send and receive data concerning the state of the parity metadata (PMD) bits on disk 110a in a manner well known to those of ordinary skill in the field. Of course, each time the state of the PMD bits in the cache 124a are changed the PMD bits on disk 110a must be updated and the reverse is also necessary. The status logic control 122a is connected to the cache 124a via bus 128a to identify the affected PMD bits. If any read operations are needed for the read modify write (RMW) or reconstruct write (RW) algorithms the read/write control logic 116a reads parity blocks from drive 108A on bus 106A and read/write control logic 116b through 116n+1 reads appropriate data from drives 108b through 108n+1 on bus 106b through 106n+1. The read/write control logic 116a sends a signal to set control logic 130a via bus 132a to indicate a write operation and the set control logic 130a sends a signal to cache 124a via bus 134a to set the PMD bits for each affected PMD bit identified by status control logic 122a. Exclusive-OR regeneration logic 136 connected to read/write control logic 116a through 116n+1 via bus 150 calculates new parity, as is well known to those of ordinary skill in the field. The new parity and the new data from the user application 100 is written at the appropriate blocks of the disks 110a through 110n+1. The successful completion of the write operation is determined by the read/write control logic 116a through 116n+1. If the write operation is successful a signal is sent from read/write control logic 116a to the clear logic control 138a via bus 140a. The clear logic control 138a is connected via bus 142a to the cache 124a to clear the affected PMD bits. Each read/write control logic 116a through 116n+1 involved in the write operation also sends a signal to status signal generator 144 via bus 146. The status signal generator 144 sends a write success message or signal via bus 148 to the user application indicating that all write operations were successful. If the data write operation is successful but the parity write operation is unsuccessful, the read/write control logic 116a does not send a signal to the clear logic control 138a and the PMD bits are left in the set state. The appropriate read/write control logic 116b through 116n+1 does send a signal to status signal generator 144 via bus 146. The status signal generator 144 sends a write success signal or message via bus 148 to the user application indicating that the data write operation was successful since the user application is only concerned with the data write portion of the write operation. If the data write operation is unsuccessful, the read/write control logic 116a does not send a signal to clear logic control 138a and the PMD bits remain set but the appropriate read/write control logic 116b through 116n+1 does send a signal to status signal generator 144 via bus 146 and an error signal is sent via bus 148 to the user application indicating that the write operation was unsuccessful. The status control logic 122a, the set control logic 130a and the clear control logic 138a comprise a plurality of logic gates that provides the described output based upon the various inputs as is well within the ability of one of ordinary skill in the field and the particular arrangement of logic gates is a design choice and therefore not described further herein.

A read request or command is initiated by user application 100 and sent via bus 102 to the RAID controller 104. The RAID control logic 112 identifies the affected data blocks and sends a signal over bus 114 to the appropriate read/write control logic 116a through 116n+1. An appropriate control signal is sent over control/data buses 106a through 106n+1 to the disk drives 108a through 108n+1 which read the affected data blocks from disks 110a through 110n+1 as is well known to those of ordinary skill in the field and the read operation ends successfully. If one or more of the affected data blocks is unavailable, the RAID control logic 112 identifies the remaining data blocks, the parity blocks and PMD bits corresponding to the unavailable data blocks. Each read/write control logic 116a through 116n+1 is connected to a status network 118a through 118n+1. Each status network is identical and therefore only the status network 118a connected to read/write logic 116a is described in detail. A control signal identifying the PMD bits corresponding to the parity blocks associated with the unavailable data blocks is sent over bus 120a to the status logic control 122a which maps the identified affected PMD bits to the appropriate address in cache 124a. The read/write control logic 116a is connected to set control logic 130a via bus 132a to indicate that the operation being performed is a read. Set control logic 130a receives from cache 124a the state of the PMD bits identified by status control logic 122a. If all of the PMD bits are clear the set control logic 130a signals read/write control logic 116a via bus 132a and the unavailable data blocks are regenerated at Exclusive-OR regeneration logic 136 as is well known in the field. The regenerated data blocks are sent via bus 150 to appropriate read/write control logic 116b through 116n+1 and then via bus 106a to the drives 108b through 108n+1 and written on disks 110b through 110n+1. The read and regenerated data blocks are also sent to the user application via bus 102 and the read operation ends successfully. If set control logic 130a determines that one of the PMD bits from cache 124a is set, a signal is sent to read/write control logic 116a. Then a signal is sent from read/write control logic 116a via bus 146 to status signal generator 144 which sends a read failure error signal or message via bus 148 to user application 100 and the read operation ends unsuccessfully.

Figure 8:
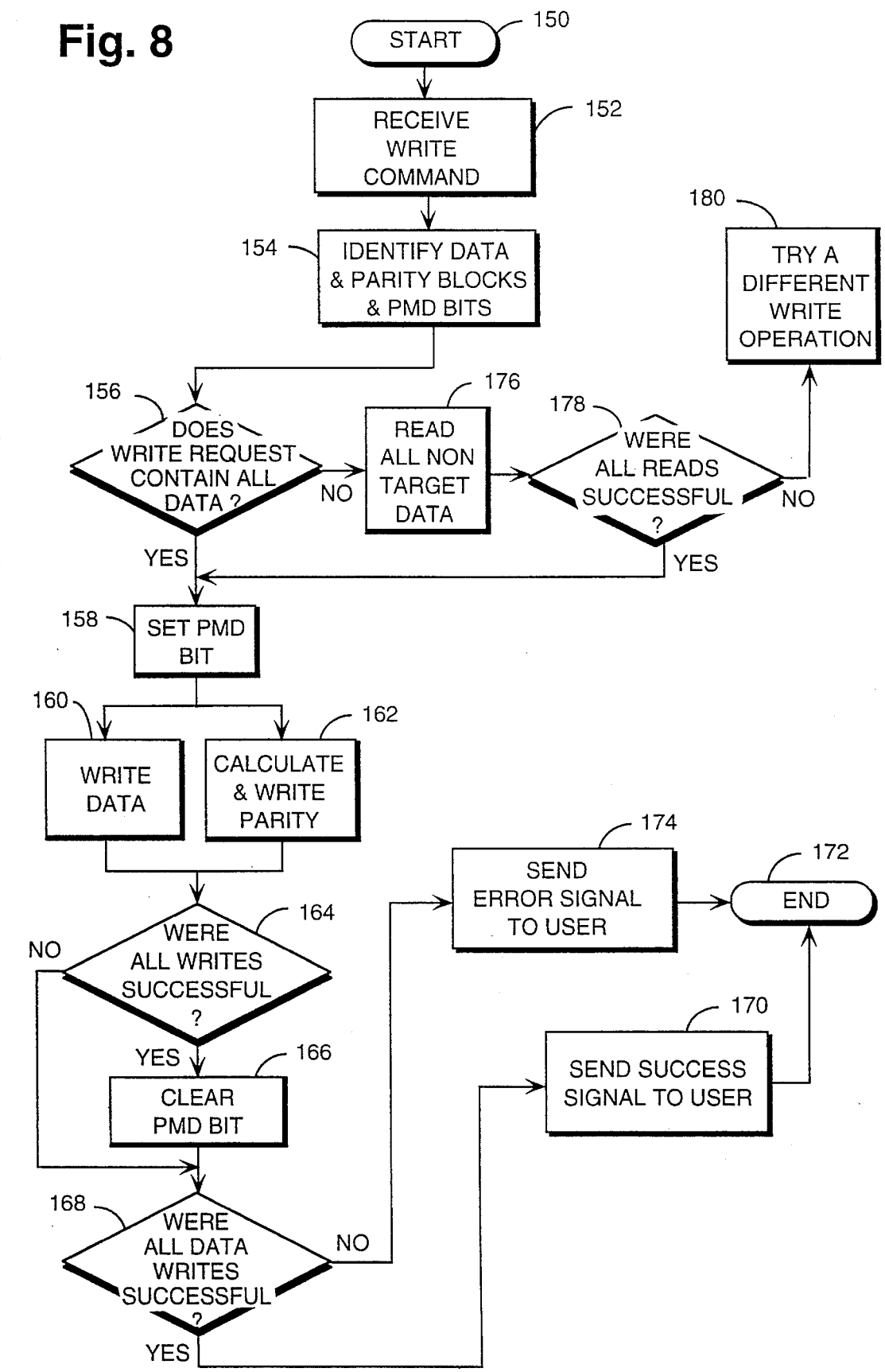
FIG. 8 is a flow chart according to the present invention for a reconstruct write operation.

FIG. 8 is a flow chart according to the present invention for a reconstruct write operation. A write operation is initiated at a user or client operation such as the CPU 18 of FIG. 1 and represented by start block 150. The write command is received at block 152 and the affected or targeted data blocks, parity blocks and parity metadata bits are identified at step 154.

Next, at step 156 the process determines if the write request contains all of the data needed to compute parity. As previously explained, each parity block is associated with n data blocks. If a write request is directed to all of the n data blocks associated with a parity block, then the write request contains all of the data needed to compute parity. If the write request is not directed to all the n data blocks, then the write request does not contain all of the data needed to compute parity. If the write request contains all of the data needed to compute parity, then the affected parity metadata bit is set at step 158. Next at step 160 the new data is written at the appropriate data block and the new parity is calculated and written at the appropriate corresponding parity block at step 162. If the writes were successful as determined at step 164, then the parity metadata bit is cleared at step 166. If any write was unsuccessful as determined at step 164 the parity metadata bit remains set and the process proceeds. At step 168 the process determines if all data write operations were successful. If all data write operations were successful as determined at step 168, then at step 170 a success signal is sent to the user and the process ends at step 172. If all data write operations were not successful as determined at step 168, then at step 174 an error signal is sent to the user and the process ends at step 172.

If the write request does not contain all of the data needed to compute parity as determined at step 156, then all non-targeted data blocks are read at step 176. If all the reads are successful as determined at step 178, then the process proceeds to step 158. If all of the reads were not successful as determined at step 178, then at step 180 a read modify write operation or other write operation is performed.

Figure 9A:
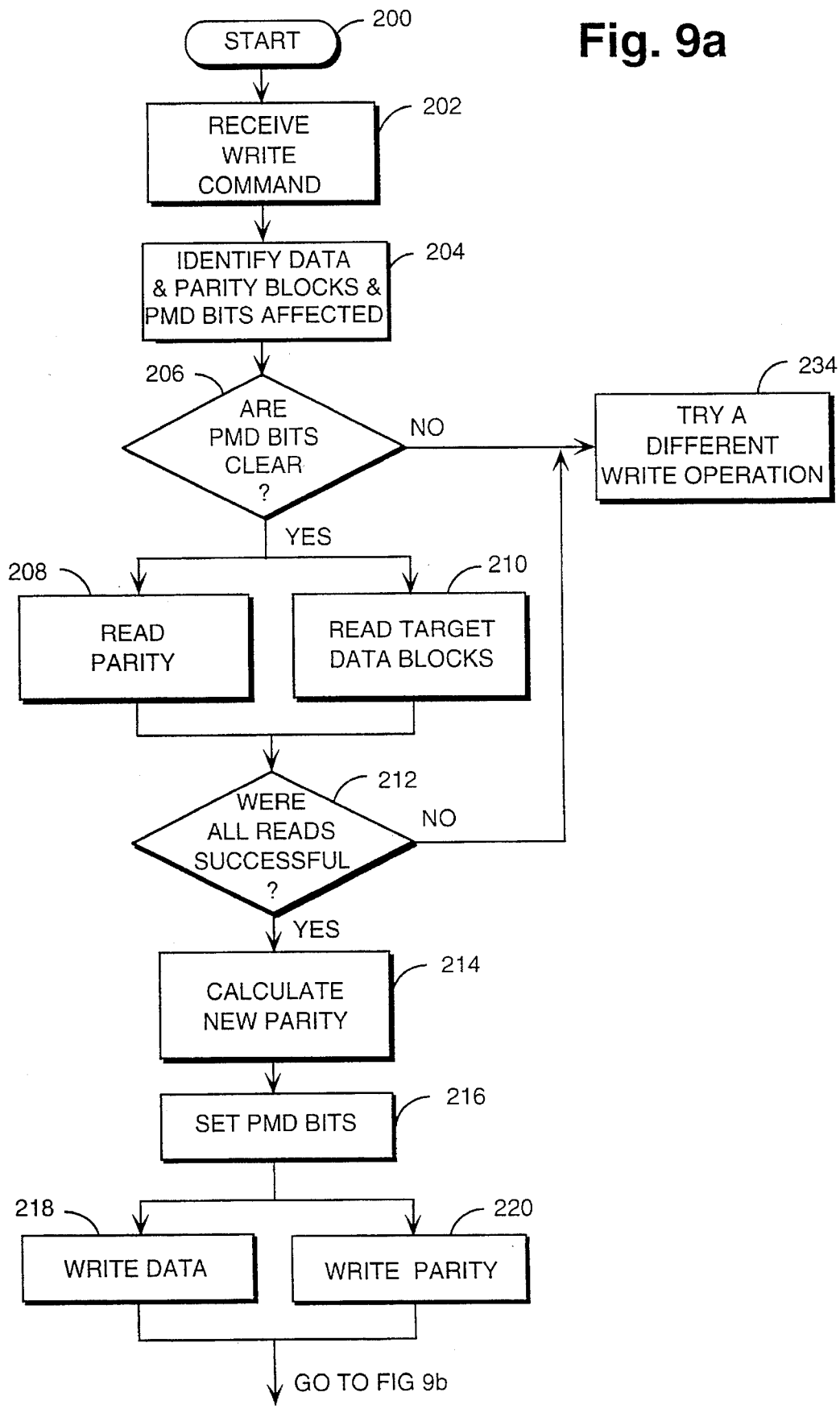

FIGS. 9a and 9b are flow charts according to the present invention for a read modify write operation. A write operation is initiated at a user or client application such as CPU 18 of FIG. 1 and represented by start block 200. The write operation is received at block 202 and the affected or targeted data blocks, parity blocks and parity metadata bits are identified at step 204. Next at step 206 the state of the parity metadata bits are checked. If the parity metadata bits are clear, then at step 208 the associated parity block is read and at step 210 the targeted data blocks are read. If all of the read operations are successful as determined at step 212, then at step 214 calculate by Exclusive-OR the new parity. Next at step 216 the associated parity metadata bits are set. Now, the new data is written at step 218 and the new parity is written at step 220. If all write operations were successful as determined at step 222 then the parity metadata bits are cleared at step 224 and the process proceeds to step 226 to determine if all data write operations were successful. If any write operation is unsuccessful as determined at step 222 the process proceeds to step 226. If all data writes were successful as determined at step 226 then a success signal is sent to the user at step 228 and the process ends at step 230. If all the write operations were not successful then an error signal is sent to the user at step 232 and the process ends at step 230. If any parity metadata bit is set as determined at step 206, or if all the read operations are not successful as determined at step 212, then a reconstruct write operation or other write operation is performed at step 234.

A logging process and apparatus for a data storage system with a RAID army organization of data has been described.

A small portion of each disk is set aside for parity metadata bits that correspond to parity blocks. During any write operation, the parity metadata bits for the parity block affected are set and cleared only if both the data write and parity write operations are successful. Thus, a parity metadata bit is in a set state if either stage of a write operation involving the parity block is not successfully completed and in a clear state otherwise. In a subsequent read operation that requires regeneration using the standard RAID algorithm, the parity metadata bit of a parity block is checked before the parity is used in regeneration. If the parity metadata bit is clear then regeneration proceeds normally including repair of the unavailable data block and the target data including the regenerated data is sent to the user, but if the parity metadata bit is set the unavailable data block is not regenerated and a read failure error signal is sent to the user. Therefore, if the PMD bit is set the process proceeds as if the parity block is unreadable and corrupt data is not created. The parity metadata bits are placed on the same disk containing the corresponding parity blocks and also stored in a cache for easy access. A strip set of the RAID array is structured as a metadata unit with the parity metadata segment located near the corresponding parity blocks.

What is claimed is:

1. A method of operating an array of storage devices, comprising the steps of:

receiving a write request from a processor coupled to said array of storage devices, said write request containing data to be stored on said array of storage devices;

identifying, in response to said write request, a metadata unit data structure (MDU) stored on said array of storage devices to receive said data, said MDU containing a parity block and a set of data blocks, both blocks comprising of a plurality of bits, the bits of said parity block reflecting the parity of a set of corresponding bits from said data blocks when said parity block and said data blocks are consistent with respect to each other, said MDU also including parity metadata (PMD) providing information about whether said parity block and said data blocks are consistent;

setting said PMD to a value indicating that said parity block and said data blocks may be inconsistent;

writing said data to one of said data blocks after said PMD has been set to said inconsistency-indicating value;

updating said parity block to reflect the new parity of said data blocks upon the writing of said data to said one data block, said parity block being updated after said PMD has been set to said inconsistency-indicating value and either before or after said data has been written to said one data block;

determining whether the writing of said data and the updating of said parity block have both successfully completed;

if the writing of said data and the updating of said parity block have both successfully completed, setting said PMD to a value indicating that said parity block and said data blocks are consistent;

if the writing of said data and the updating of said parity block have not both successfully completed, leaving said PMD with said inconsistency-indicating value;

receiving, after said MDU has been updated in the preceding manner, a read request from said processor for one of said data blocks in said MDU;

determining whether the data block to be read is available;

if the data block to be read is available, reading the data block and returning it to said processor;

if the data block to be read is not available, carrying out the following steps:
   (a) reading said PMD in said MDU to determine whether said parity block and said data blocks are consistent;
   (b) if said PMD in said MDU indicates that said parity block and said data blocks are consistent, carrying out the following steps:
      (i) regenerating the unavailable data block from said parity block and data blocks other than the unavailable data block in said MDU; and
      (ii) returning the regenerated data block to said processor; and
   (c) if said PMD in said MDU indicates that said parity block and said data blocks may be inconsistent, refraining from regenerating the unavailable data block from said parity block and said other data blocks in said MDU.

2. A method according to claim 1, wherein: (1) said parity block and said set of data blocks are part of a strip distributed across said storage devices; (2) said MDU comprises said strip and additional similar strips, the consistency of the parity and data blocks in said strips being indicated by said PMD; (3) one of said storage devices is designated a parity storage device; (4) said strips are arranged such that the parity block from each strip is on said parity storage device; and (5) said PMD is also on said parity storage device; and wherein any of said steps in claim 1 involving reading or writing either said PMD or said parity block comprises the step of accessing said parity storage device.

3. A method according to claim 2, wherein said PMD comprises bits each indicating the consistency between the parity block and the data blocks in a corresponding one of said strips, and wherein each bit, when set, indicates that the parity block and the data blocks in the corresponding strip may be inconsistent and, when cleared, indicates that the parity block and the data blocks in the corresponding strip are consistent.

4. A method according to claim 1, wherein: (1) said parity block and said set of data blocks are part of a strip distributed across said storage devices; (2) said MDU comprises said strip and additional similar strips, the consistency of the parity and data blocks in said strips being indicated by said PMD; (3) said strips are arranged such that parity blocks from different strips generally reside on different ones of said storage devices; and (4) said PMD is distributed as a PMD segment across all of said storage devices such that the portion of said PMD segment on a given storage device indicates the consistency between the parity block and data blocks for those strips whose parity block resides on that storage device; and further comprising the step of determining which of said storage devices contains said parity block and said PMD for the strip to which said data is to be written.

5. A method according to claim 4, wherein said PMD comprises bits each indicating the consistency between the parity block and the data blocks in a corresponding one of said strips, and wherein each bit, when set, indicates that the parity block and the data blocks in the corresponding strip may be inconsistent and, when cleared, indicates that the parity block and the data blocks in the corresponding strip are consistent.

6. A method according to claim 1, further comprising the step of sending a write success signal to said processor if the writing of said data has successfully completed.

7. A method according to claim 1, further comprising the step of sending an error signal to said processor if the writing of said data has not successfully completed.

8. A method according to claim 1, further comprising the step of writing the regenerated data block to the location occupied by said unavailable data block in said MDU if said step of regenerating the unavailable data block is carried out.

9. A method according to claim 1, further comprising the step of sending an error signal to said processor if said step of refraining from regenerating the unavailable data block is carried out.

10. A method according to claim 1, wherein said PMD comprises a bit which when set indicates that said parity block and said data blocks may be inconsistent and when cleared indicates that said parity block and said data blocks are consistent.

* * * * *